(12) United States Patent
Simonsson et al.

(10) Patent No.: US 12,368,566 B2
(45) Date of Patent: Jul. 22, 2025

(54) SELECTION OF TDD PATTERNS FOR DL AND UL COMMUNICATION

(71) Applicant: Telefonaktiebolaget LM Ericsson (publ), Stockholm (SE)

(72) Inventors: Arne Simonsson, Gammelstad (SE); Peter De Bruin, Gammelstad (SE); Sara Sandberg, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 361 days.

(21) Appl. No.: 18/044,883

(22) PCT Filed: Sep. 24, 2020

(86) PCT No.: PCT/SE2020/050896
§ 371 (c)(1),
(2) Date: Mar. 10, 2023

(87) PCT Pub. No.: WO2022/066075
PCT Pub. Date: Mar. 31, 2022

(65) Prior Publication Data
US 2023/0361979 A1    Nov. 9, 2023

(51) Int. Cl.
*H04L 5/14*   (2006.01)
(52) U.S. Cl.
CPC .................................. *H04L 5/1469* (2013.01)

(58) Field of Classification Search
CPC ...... H04L 5/1469; H04L 5/001; H04W 72/52; H04W 16/16; H04W 16/04
See application file for complete search history.

(56) References Cited

U.S. PATENT DOCUMENTS

| | | | |
|---|---|---|---|
| 2013/0303177 A1* | 11/2013 | Chen | H04W 72/00 455/450 |
| 2014/0086078 A1* | 3/2014 | Malladi | H04L 5/1469 370/252 |
| 2016/0345332 A1 | 11/2016 | Cheng et al. | |
| 2018/0152268 A1 | 5/2018 | Gauvreau et al. | |

OTHER PUBLICATIONS

International Search Report and Written Opinion dated Jun. 23, 2021 for International Patent Application No. PCT/SE2020/050896 filed Sep. 24, 2020, consisting of 10-pages.

* cited by examiner

*Primary Examiner* — Sun Jong Kim
(74) *Attorney, Agent, or Firm* — Weisberg I.P. Law, P.A.

(57) ABSTRACT

Mechanisms for selecting TDD patterns for DL and UL communication in TDD slots on CCs in a cell. A method is performed by a network management node. The method includes performing selection of the TDD patterns for DL and UL communication on CCs in the cell. According to the selection of the TDD patterns, at least one of the CCs is configured with a first TDD pattern, and at least one of the CCs is configured with a second TDD pattern. There is a higher fraction of DL TDD slots in the first TDD pattern than in the second TDD pattern.

19 Claims, 7 Drawing Sheets

SELECTION OF TDD PATTERNS FOR DL AND UL COMMUNICATION

CROSS-REFERENCE TO RELATED APPLICATION

This application is a Submission Under 35 U.S.C. § 371 for U.S. National Stage Patent Application of International Application Number: PCT/SE2020/050896, filed Sep. 24, 2020 entitled "SELECTION OF TDD PATTERNS FOR DL AND UL COMMUNICATION," the entirety of which is incorporated herein by reference.

TECHNICAL FIELD

Embodiments presented herein relate to a method, a network management node, a computer program, and a computer program product for selecting time-division duplex (TDD) patterns for downlink (DL) and uplink (UL) communication in TDD slots on component carriers (CCs) in a cell.

BACKGROUND

In communications networks, there may be a challenge to obtain good performance and capacity for a given communications protocol, its parameters and the physical environment in which the communications network is deployed.

For example, wireless devices (such as user equipment; UE) are today typically limited to using one multiple-input multiple-output (MIMO) layer transmissions, have limited carrier aggregation (CA) capabilities (such as limited number of CCs, i.e., limited bandwidth), and have limited (total) output power. Some improvements on the number of MIMO layers and UL CA are foreseen, but the total output power will still be an overall limitation, potentially limiting the performance for the wireless devices.

Today, all existing implemented TDD patterns are DL heavy. A TDD pattern is seen as DL heavy when the fraction of DL TDD slots is higher than the fraction of UL TDD slots for that TDD pattern. Due to the limitations above, even a balanced TDD pattern with as many DL TDD slots as UL TDD slots would result in higher throughput in the DL than in the UL.

However, communications networks, such as those that in the same geographical area are using TDD, need to be fully synchronized, i.e. use the same TDD pattern and be time synchronized, to avoid/limit cross-link interference between different parts of the communications network.

Further, if adjacent CCs are utilized in neighboring parts of the communications network, or the same CC (co-channel) is used in these neighboring parts of the communications network, the communications network as a whole may suffer from cross-link interference if different TDD patterns are used in the different parts of the communications network.

Hence, there is a need for mechanisms that enable more flexible use of TDD patterns in a communications network.

SUMMARY

An object of embodiments herein is to provide mechanisms that enable flexible use of TDD patterns in a communications network, not suffering from the issues noted above or where the issues noted above at least are mitigated or reduced.

According to a first aspect there is presented a method for selecting TDD patterns for DL and UL communication in TDD slots on CCs in a cell. The method is performed by a network management node. The method comprises performing selection of the TDD patterns for DL and UL communication on CCs in the cell. According to the selection of the TDD patterns, at least one of the CCs is configured with a first TDD pattern, and at least one of the CCs is configured with a second TDD pattern. There is a higher fraction of DL TDD slots in the first TDD pattern than in the second TDD pattern.

According to a second aspect there is presented a network management node for selecting TDD patterns for DL and UL communication in TDD slots on CCs in a cell. The network management node comprises processing circuitry. The processing circuitry is configured to cause the network management node to perform selection of the TDD patterns for DL and UL communication on CCs in the cell. According to the selection of the TDD patterns, at least one of the CCs is configured with a first TDD pattern, and at least one of the CCs is configured with a second TDD pattern. There is a higher fraction of DL TDD slots in the first TDD pattern than in the second TDD pattern.

According to a third aspect there is presented a network management node for selecting TDD patterns for DL and UL communication in TDD slots on CCs in a cell. The network management node comprises a selection module configured to perform selection of the TDD patterns for DL and UL communication on CCs in the cell. According to the selection of the TDD patterns, at least one of the CCs is configured with a first TDD pattern, and at least one of the CCs is configured with a second TDD pattern. There is a higher fraction of DL TDD slots in the first TDD pattern than in the second TDD pattern.

According to a fourth aspect there is presented a computer program for selecting TDD patterns for DL and UL communication in TDD slots on CCs in a cell, the computer program comprising computer program code which, when run on a network management node, causes the network management node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects enable flexible use of TDD patterns in a communications network, not suffering from the issues noted above.

Advantageously these aspects enable UL heavy services, i.e., services that require more resource in the uplink than in the downlink, to be supported within specific areas, such as a cell, where desired at the same time as DL heavy services can be supported in other areas, such as surrounding cells.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, there is still a need for mechanisms that enable a more flexible use of TDD patterns in a communications network.

For example, existing communications networks using TDD are typically dimensioned for services that are DL heavy. One non-limiting example of such a service is mobile broadband (MBB). However, there could be services that are UL heavy, or at least where higher UL throughput than currently available is needed.

As a non-limiting and illustrative example, many industrial applications (both massive machine-type-communications (mMTC) and critical MTC (cMTC)) are expected to be UL heavy, in terms of both performance and capacity requirements. For example, streaming of high-quality video (or lidar data or radar data) from a remotely controlled machine, or vehicle, might require higher UL throughput than the DL throughput required for control of the machine, or vehicle. For mMTC applications, sensors might be configured to continuously transmit updates in UL whilst DL transmission occurs only when the operation of the sensor needs adjustment. The UL traffic from a single sensor may be reasonably limited in transferred data size, but might occur with very frequent (periodic or aperiodic) transmissions. There are also examples of sensor platforms, aggregating the information from multiple sensors, yielding large amounts of data to be transmitted in UL from the sensor platforms.

Further, using a UL heavy TDD pattern in a part of a communications network might be cumbersome if the same frequency band is used for the UL heavy TDD pattern as for a neighboring part of the communications (or even another communications network) where a DL heavy TDD pattern is used, because of possible cross-link interference.

The embodiments disclosed herein therefore relate to mechanisms for selecting TDD patterns for DL and UL communication in TDD slots on CCs in a cell. In order to obtain such mechanisms there is provided a network management node, a method performed by the network management node, a computer program product comprising code, for example in the form of a computer program, that when run on a network management node, causes the network management node to perform the method.

Figure 1:
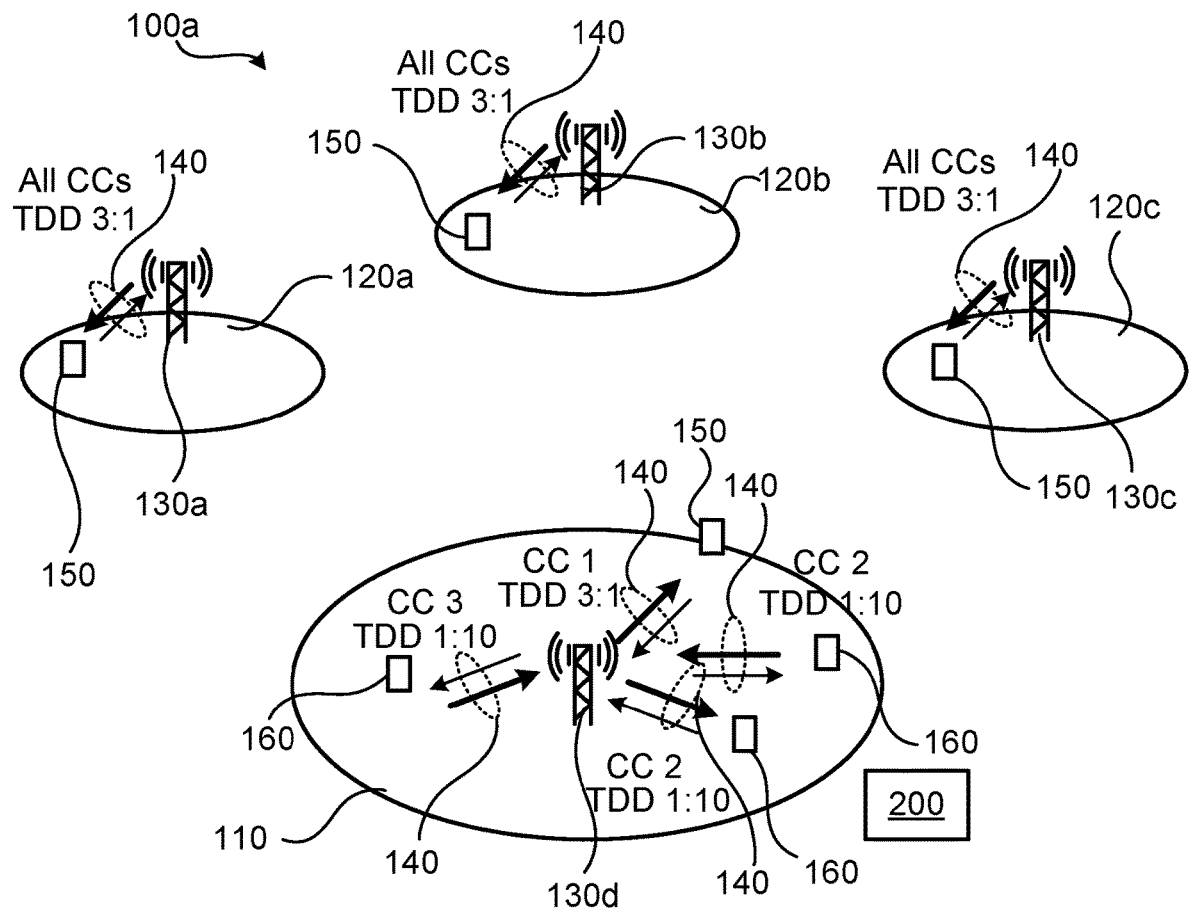
FIGS. 1, 3, and 4 are schematic diagrams illustrating a communications network according to embodiments.

FIG. 1 is a schematic diagram illustrating a communications network 100a where embodiments presented herein can be applied. The communications network 100a comprises cells 110, 120a, 120b, 120c. Each cell 110, 120a:120c is served by a respective (radio) access network node 130a, 130b, 130c, 130d. Wireless devices 150, 160 operatively connected to any of the access network node 130a:130d are thereby provided network access.

Examples of (radio) access network nodes 130a, 130b, 130c, 130d are radio base stations, base transceiver stations, Node Bs, evolved Node Bs, g NBs, access points, access nodes, and backhaul nodes. Examples of wireless devices 150, 160 mobile stations, mobile phones, handsets, wireless local loop phones, user equipment (UE), smartphones, laptop computers, tablet computers, network equipped sensors, network equipped vehicles, and so-called Internet of Things devices. Wireless devices 150 will hereinafter represent a typical wireless device using a DL heavy service such as a mobile broadband service whereas wireless devices 160 will hereinafter represent a typical wireless device using a UL heavy service such as an industrial network service.

It is assumed that TDD is used for DL and UL communication between the access network nodes 130a:130d and the wireless devices. It is further assumed that DL and UL communication is performed on CCs 140. Examples of which TDD pattern is used by each of the CCs 140 are illustrated in FIG. 1 using the notation x:y, where x denotes the total number of TDD slots per repetition cycle of the TDD pattern used for DL communication and y denotes the total number of TDD slots per repetition cycle of the TDD pattern used for UL communication. For example, the TDD pattern 3:1 is used for all CCs in cell 120a, in cell 120b, and in cell 120c. One reason for using a TDD pattern such as 3:1 is to serve wireless devices 150 using a mobile broadband service that are mainly DL heavy with for example video downloads. Wireless devices 150 with limited battery, output power and space for antennas, might typically only utilize one of the CCs for uplink.

In cell 110, the TDD pattern 3:1 is used on one CC (denoted CC 1) for communication between access network node 130d and wireless device 150 whereas the TDD pattern 1:10 is used on the remaining CCs (denoted CC 2 and CC 3) for communication between access network node 130d and wireless devices 160. This could represent a scenario where wireless devices 160 using services that are UL heavy are served in cell 110. This could be the case where the wireless devices 160 operate in an industrial network, such as remote-controlled vehicles equipped with video cameras that produce video streams that need to be transmitted in UL to a central control room for monitoring of the remote-controlled vehicles. To support such UL heavy traffic, CC 2 and CC 3 are configured with an uplink heavy TDD pattern 1:10, whereas CC has the TDD pattern 3:1, enabling coverage and support to wireless devices 150 that are using DL heavy services. As an example, if the load is limited, a wireless device 160 using an Ultra-Reliable Low-Latency Communication (URLLC) service might be allocated to a DL heavy CC for communication in UL and a UL heavy CC for communication in DL to minimize interference, packet loss and retransmission delay by using only cross-link interference free UL and DL slots. Different wireless devices 150, 160, or services used by the wireless devices 150, 160, can thus be allocated to different CCs depending on QoS requirements and network load.

The operation of at least access network node 130*d*, and thus at least of cell 110, is controlled by a network management node 200. As will be further disclosed below, the network management node 200 is configured to select, and thereby control, which TDD pattern that is to be used for DL and UL communication on CCs 140 in the cell 110. In some examples, there is one network management node 200 per cell. Thus, in some aspects, the network management node 200 is integrated with, collocated with, or part of access network node 130*d* serving cell 110 with a first TDD pattern and the second TDD pattern. In other examples, there is one single network management node 200 for all the cells, or at least for two or more of the cells. Thus, in some aspects, the network management node 200 is integrated with, collocated with, or part of a network-centric node controlling access network node 130*d* serving the cell 110 as well as at least one other access network node (such as any of access network node 130*a* to 130*c*, or yet a further access network node 130*e*, 130*f*, 130*g* as in below referenced FIG. 4).

Figure 2:
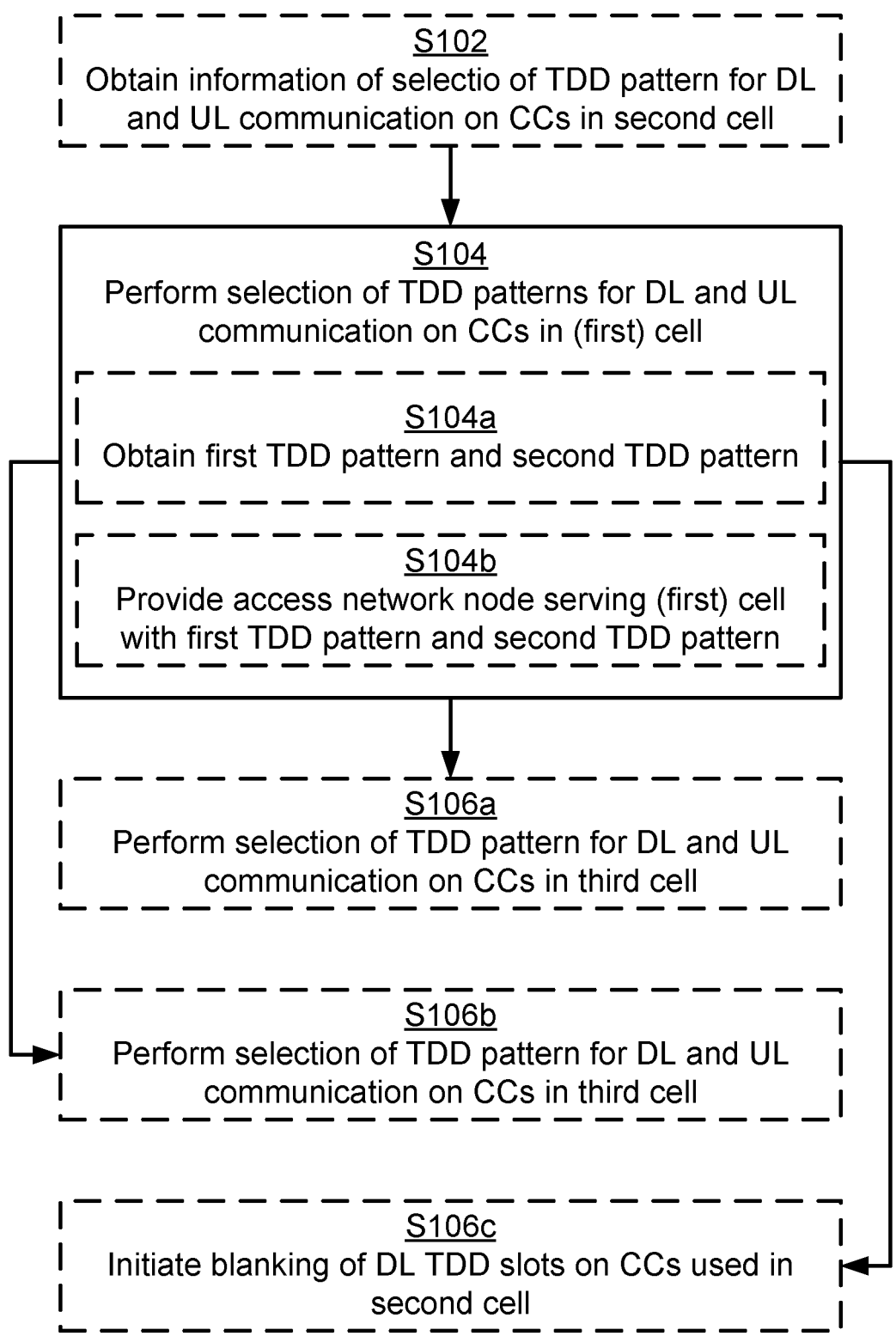
FIG. 2 is a flowchart of methods according to embodiments.

FIG. 2 is a flowchart illustrating embodiments of methods for selecting TDD patterns for DL and UL communication in TDD slots on CCs 140 in a cell 110. The methods are performed by the network management node 200. The methods are advantageously provided as computer programs 720.

As noted above, the network management node 200 is configured to select, and thereby control, which TDD pattern that is to be used for DL and UL communication on CCs 140 in the cell 110. In particular, the network management node 200 is configured to perform step S104:

S104: The network management node 200 performs selection of the TDD patterns for DL and UL communication on CCs 140 in the cell 110. According to the selection of the TDD patterns, at least one of the CCs 140 is configured with a first TDD pattern, and at least one of the CCs 140 is configured with a second TDD pattern, where there is a higher fraction of DL TDD slots in the first TDD pattern than in the second TDD pattern.

Embodiments relating to further details of selecting TDD patterns for DL and UL communication in TDD slots on CCs 140 in a cell 110 as performed by the network management node 200 will now be disclosed.

There may be different ways for the network management node 200 to in step S104 perform the selection of the TDD patterns for DL and UL communication on CCs 140 in the cell 110. In some aspects, the network management node 200 is configured to first determine the TDD patterns and then provide the TDD patterns to access network node 130*d* that serves cell 110.

Particularly, in some embodiments the network management node 200 is configured to perform the selection of the TDD patterns by performing steps S104*a* and S104*b*:

S104*a*: The network management node 200 obtains the first TDD pattern and the second TDD pattern.

S104*b*: The network management node 200 provides access network node 130*d* serving the cell 110 with the first TDD pattern and the second TDD pattern.

The access network node 130*d* might then utilize the first TDD pattern and the second TDD pattern e.g. for scheduling purposes when communicating with the wireless devices 150, 160 served in cell 110.

There could be different examples of first TDD patterns and second TDD patterns. Embodiments, aspects, and examples of different first TDD patterns and second TDD patterns will now be disclosed.

In some examples, the first TDD pattern is DL heavy whereas the second TDD pattern is UL heavy. That is, in some embodiments, in the first TDD pattern there is a higher fraction of DL TDD slots than UL TDD slots, and in the second TDD pattern there is a higher fraction of UL TDD slots than DL TDD slots. This could be advantageous in cells with desired uplink heavy traffic load, such as video streams from wireless devices 160 in terms of remote-controlled vehicles within a private property industry area, where specific CC(s) are configured with an uplink heavy TDD pattern. One or a few CC(s) could be configured with a downlink heavy TDD pattern as for surrounding areas supporting wireless devices 150 using mobile broadband services.

In some aspects, one CC with the same TDD pattern as used in neighbouring cells is used. That is, assuming that the cell 110 is a first cell 110 that neighbors a second cell 120*a*, 120*b*, 120*c*, the network management node 200 is in an embodiment configured to perform (optional) step S102:

S102: The network management node 200 obtains information of selection of TDD pattern for DL and UL communication on CCs 140 in the second cell 120*a*, 120*b*, 120*c*. According to the selection of TDD patterns for DL and UL communication on CCs 140 in the first cell 110, at least one but not all of the CCs 140 in the first cell 110 is configured with the same TDD pattern as CCs 140 in the second cell 120*a*, 120*b*, 120C.

Figure 3:
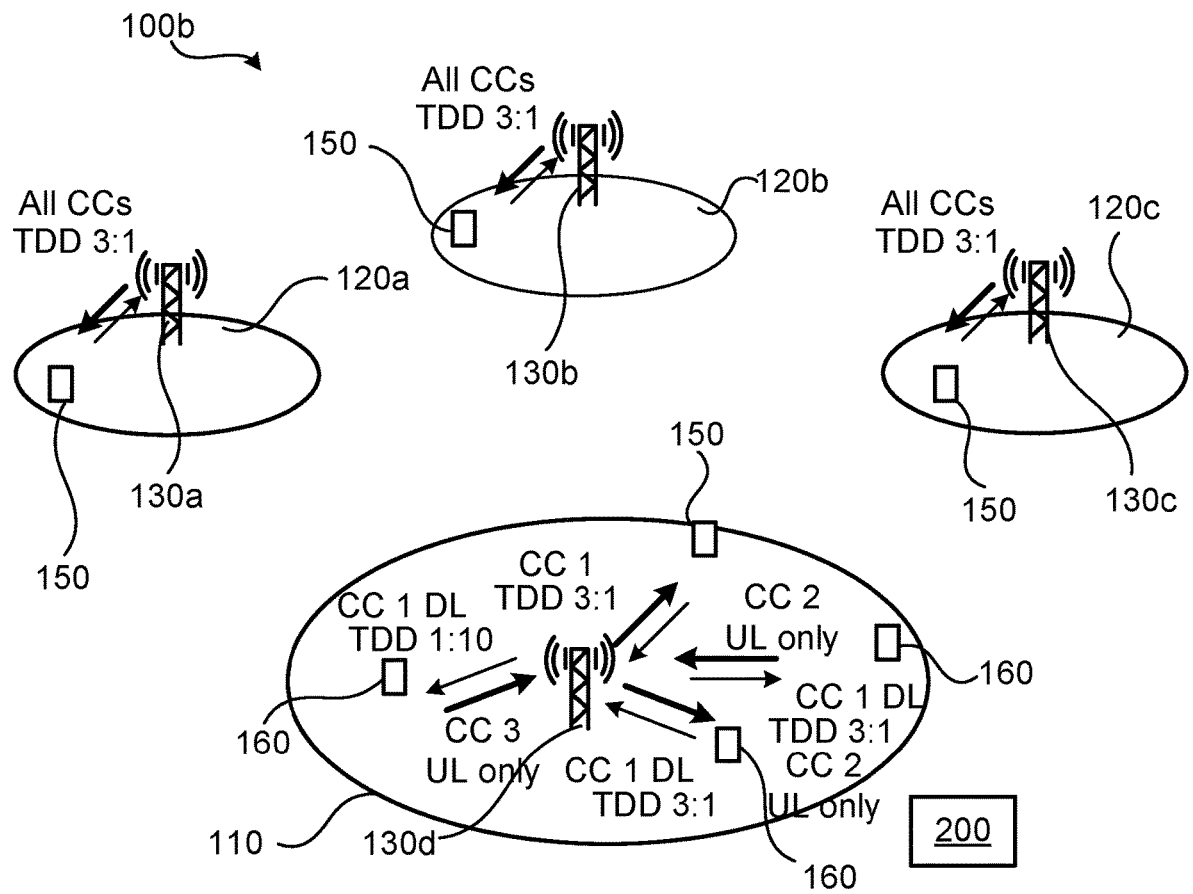

By in cell 110 using a CC with the same TDD pattern as in cells 120*a*, 120*b*, 120*c*, this could limit the cross-link interference caused by wireless devices 150 served by any of cells 120*a*, 120*b*, 120C that enter the area served by cell 110. Serving wireless devices 150 by cell 110 with a CC with the same TDD pattern as in cells 120*a*, 120*b*, 120C would further reduce cross-link interference If interference situation allows, e.g., with high isolation between cell 110 and cells 120*a*, 120*b*, 120*c*, all available CCs could be used with an UL-heavy TDD pattern (if that would be required). Parallel reference is here made to FIG. 3 which schematically illustrates a communications network 100*b* similar to the communications network 100*a* of FIG. 1, but where the component carriers denoted CC 2 and CC 3 as used in cell 110 are configured with a TDD pattern where all TDD slots are UL TDD slots and where the reference numerals 140 for the CCs have been removed to avoid clutter. That is, in some embodiments, according to the second TDD pattern, all TDD slots are UL TDD slots. This could further increase the uplink capacity. Each wireless device 160 is then in cell 110 served on the component carriers denoted CC1 in DL and on either of the component carriers denoted CC 2 and CC 3 in UL.

Figure 4:
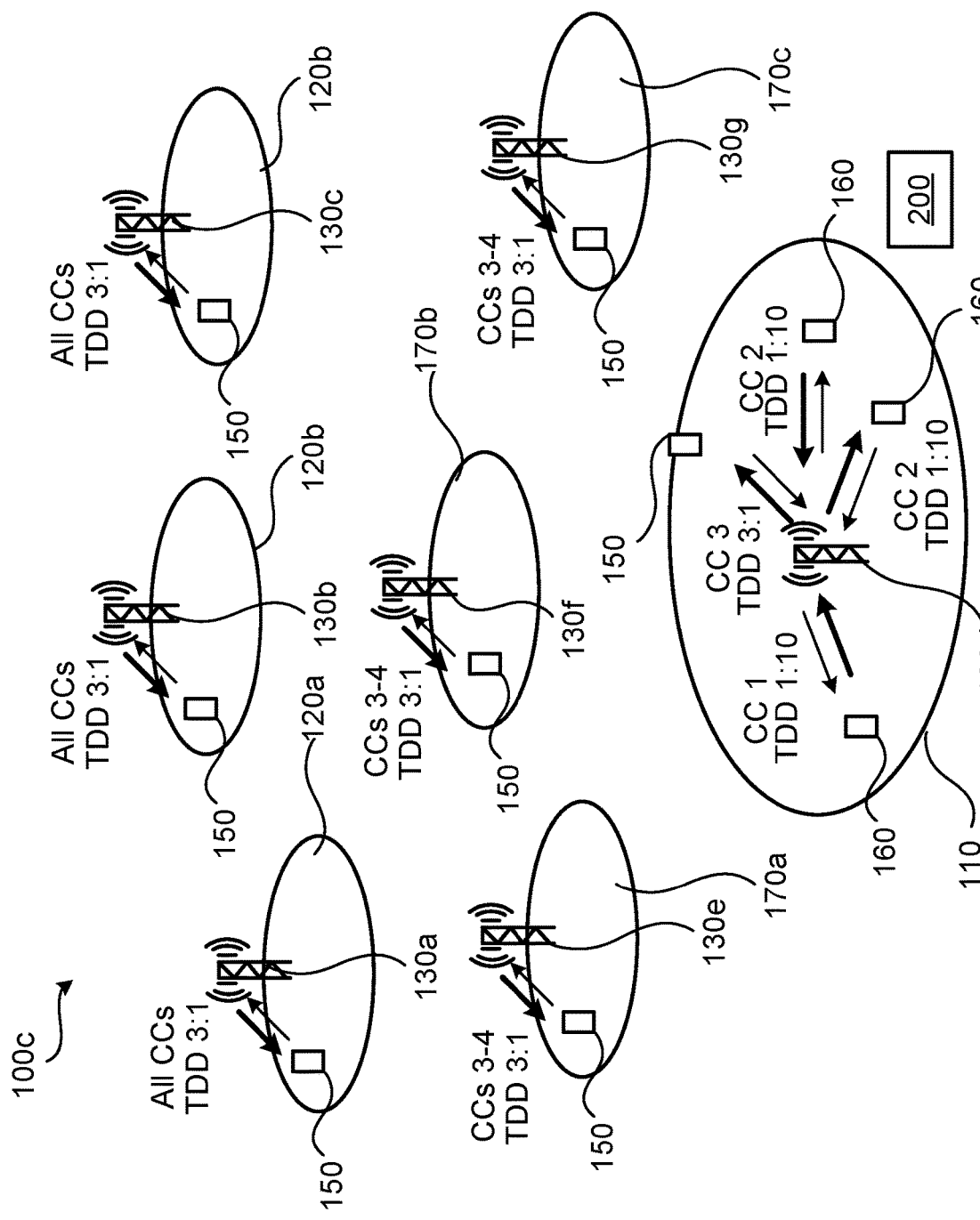

Parallel reference is now made to FIG. 4 which schematically illustrates a communications network 10c similar to the communications network 100a of FIG. 1, but comprising additional cells 170a, 170b, 170c, each served by a respective access network node 130e, 130f, 130g and where the reference numerals 140 for the CCs have been removed to avoid clutter. These additional cells 170a, 170b, 170c could act as a buffer zone between cell 110 and cells 120a, 120b, 120c.

As an example, for Frequency Range 2 (FR2; including frequency bands from 24.25 GHz to 52.6 GHz) and also for Frequency Range 1 (FR1; including sub-6 GHz frequency bands, some of which are traditionally used frequency bands but also including extensions to cover frequency bands from 410 MHz to 7125 MHz), in private industry networks served by cell 110 in an indoor environment where walls isolate well from surroundings, cross-link interference can in many cases be insignificant. But for outdoor environments, cross-link interference from surrounding cells 120a, 120b, 120C may block communication in the private industry networks in UL (and the other way around). Also, if uplink heavy services are desired on, for example, public roads there can be impact from cross-link interference. To mitigate this, additional cells 170a, 170b, 170c surrounding the cell 110 could be configured utilizing a CC (denoted CC4 in FIG. 4) which is not used within cell 110, enabling full coverage and limited cross-link interference. Buffer zones, as achieved by the additional cells 170a, 170b, 170c, between cell 110 (having CCs configured with with UL-heavy TDD pattern(s)) and cells 120a, 120b, 120C (having CCs configured with DL-heavy TDD pattern(s)) could be used in network deployments utilizing FR1 to avoid interference due to UL and DL transmissions not being aligned (but still time synchronized).

In the example of FIG. 4, for cells 120a, 120b, 120C there are four CCs (CC 1 to CC 4) and all are configured with TDD pattern 3:1, for cells 170a, 170b, 170c there are two CCs (CC 3 and CC 4) and both are configured with TDD pattern 3:1, and for cell 110 there are two CCs (denoted CC 1 and CC 2) configured with TDD pattern 1:10 and one CC (denoted CC 3) configured with TDD pattern 3:1. As an alternative, CC 1 and CC 2 could be replaced by a fifth CC in cell 110 or this fifth CC could be added to cell 110, without removal of CC 1 and CC 2 in cell 110. This fifth CC is not used in any other cell but cell 110. That is, in some embodiments, the cell 110 is a first cell 110 that neighbors a third cell 170a, 170b, 170c, and the network management node 200 is configured to perform selection of TDD pattern for the third cell 170a, 170b, 170c. In such embodiments, the network management node 200 could be configured to perform (optional) step S106a:

S106a: The network management node 200 performs selection of the TDD pattern for DL and UL communication on CCs 140 in the third cell 170a, 170b, 170c. According to the selection of the TDD pattern for the third cell 170a, 170b, 170c, DL and UL communication is to be performed on at least one CC 140 not used in the first cell 110.

Further, cells 170a, 170b, 170c surrounding cell 110 could be configured to only use the DL heavy CCs in cell 110 (CC 3 in FIG. 4) and/or other CCs (such as CC 4) not used in cell 110. Hence, assuming that the cell 110 is a first cell 110 that neighbors a third cell 170a, 170b, 170c, and that the network management node 200 is configured to perform selection of TDD pattern for the third cell 170a, 170b, 170c, the network management node 200 is, in some embodiments, configured to perform (optional) step S106b:

S106b: The network management node 200 performs selection of the TDD pattern for DL and UL communication on CCs 140 in the third cell 170a, 170b, 170c. According to the selection of the TDD pattern for the third cell 170a, 170b, 170c, the CCs 140 in the third cell 170a, 170b, 170c are configured with a third TDD pattern having DL TDD slots only coinciding with DL TDD slots of the second (UL heavy) TDD pattern and UL TDD slots only coinciding with UL TDD slots of the first (DL heavy) TDD pattern.

Yet further embodiments relating to further details of selecting TDD patterns for DL and UL communication in TDD slots on CCs 140 in a cell 110 as performed by the network management node 200 will now be disclosed In some aspects, the UL heavy CCs 140 are on frequencies not used in any neighbouring cell 120a, 120b, 120c, 170a, 170b, 170c. That is, in some embodiments, the cell 110 is a first cell 110 that neighbors a second cell 120a, 120b, 120c, and wherein the CCs 140 occupy at least one frequency interval that is not occupied by CCs 140 used in the second cell 120a, 120b, 120c.

In some aspects, some DL subframes are blanked. That is, assuming that the cell 110 is a first cell 110 that neighbors a second cell 120a, 120b, 120c, the network management node 200 is in some embodiments configured to perform (optional) step S106c:

S106c: The network management node 200 initiates blanking of at least some of the DL TDD slots on CCs 140 used in the second cell 120a, 120b, 120c. Which at least some of the DL TDD slots to blank are dependent on the first TDD pattern and the second TDD pattern.

This could further limit any cross-link interference.

In some aspects, there is one single DL heavy CC used in cell 110. That is, in some embodiments, one single CC in the cell 110 is configured with the first TDD pattern.

As in the explanation of FIG. 4, in some embodiments, the cell 110 covers a private property area. An industrial site might be located at the private property area. Cell 110 might then serve an industry network of the industrial site, where at least some wireless devices 160 of the industry network are served on the at least one of the CCs 140 configured with the second TDD pattern.

There could be different ways to identify which TDD patterns to be used. In some aspects, at least one of the TDD patterns is identified based on measured uplink and downlink data load. That is, in some embodiments, which fraction of DL TDD slots and which fraction of UL TDD slots to use in the second TDD pattern is identified based at least on UL measurements in cell 110.

There could be different frequency bands used for the CCs. In this respect, nation-wide services might be provided by a mobile network operator on FR2 with 3 CCs, such as the 28 GHz frequency band in the United States of America where a mobile network operator can have up to 4 CCs, each with a frequency range of 100 MHz on the 28 GHz frequency band or the 39 GHz frequency band. Thus, in some aspects, the frequency band is a licensed spectrum mmWave FR2 or higher. But also lower frequency bands could be utilized. In some non-limiting examples, the CCs 140 in cell 110 occupy frequency bands from 24.25 GHz and higher or occupy frequency bands from 6 GHz and lower. In further aspects, a CC might be split into further CCs. That is, in some embodiments, at least one of the CCs 140 in the cell 110 is split into at least two further CCs 140, where each of these at least two further CCs 140 are individually configured with any of: the first TDD pattern, the second TDD pattern, a third TDD pattern. For example, one CC with a frequency range of 100 MHz could be split into two CCs, each having a frequency range of 50 MHz.

At FR2 frequency bands the cross-link interference is limited and complete blocking of wireless devices 160 around the wireless devices 150 may only be a few tens of meters. This can in many cases be acceptable within an industry site where also other sources, or types, of interference, such as high-power equipment and electric power machines, can block communication. For most of the industry site the impact will mainly be a small degradation of service.

In some aspects, only specific users are allocated to the CCs 140 with the second TDD pattern. That is, in some embodiments, only a subset of all wireless devices 150, 160 served in the cell 110 are served on the CCs 140 configured with the second TDD pattern. In some aspects, the allocation of users to the CCs 140 with the second TDD pattern is based on the required QoS for the service used by these users. That is, in some embodiments, which of all wireless devices 150, 160 served in the cell 110 to be served on the CCs 140 configured with the second TDD pattern depends on at least one of: required quality of service of the wireless devices 150, 160, subscription of the wireless devices 150, 160.

Figure 5:
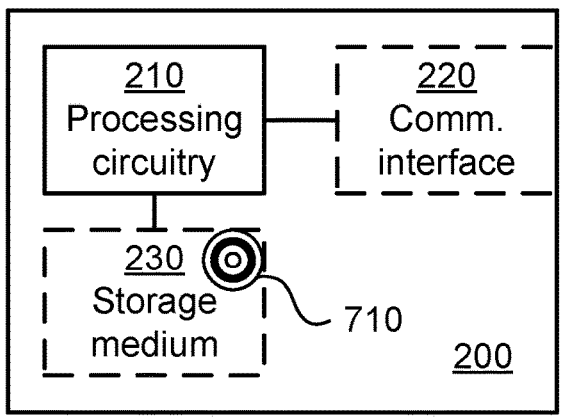
FIG. 5 is a schematic diagram showing functional units of a network management node according to an embodiment.

FIG. 5 schematically illustrates, in terms of a number of functional units, the components of a network management node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the network management node 200 to perform a set of operations, or steps, as disclosed above. For example, the storage medium 230 may store the set of operations, and the processing circuitry 210 may be configured to retrieve the set of operations from the storage medium 230 to cause the network management node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network management node 200 may further comprise a communications interface 220 at least configured for communications with at least one access network node 130d in any of the communications networks 100a, 100b, 100c. As such the communications interface 220 may comprise one or more transmitters and receivers, comprising analogue and digital components. The processing circuitry 210 controls the general operation of the network management node 200 e.g. by sending data and control signals to the communications interface 220 and the storage medium 230, by receiving data and reports from the communications interface 220, and by retrieving data and instructions from the storage medium 230. Other components, as well as the related functionality, of the network management node 200 are omitted in order not to obscure the concepts presented herein.

Figure 6:
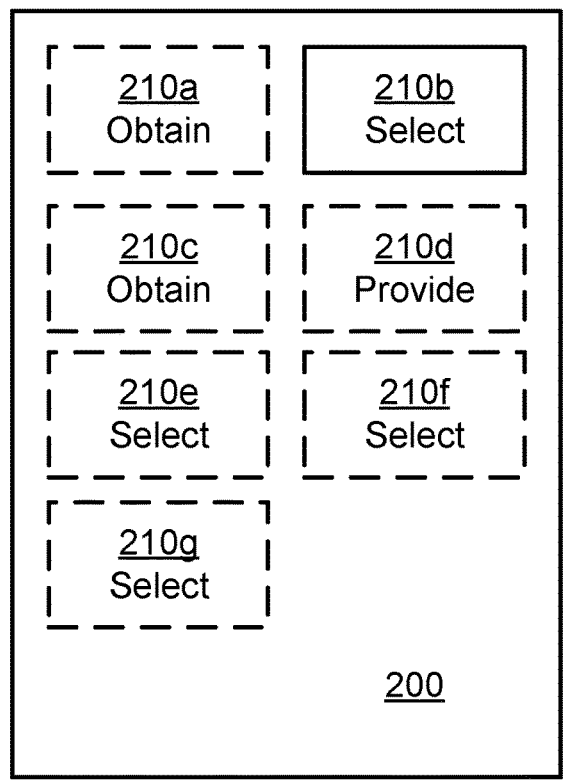
FIG. 6 is a schematic diagram showing functional modules of a network management node according to an embodiment.

FIG. 6 schematically illustrates, in terms of a number of functional modules, the components of a network management node 200 according to an embodiment. The network management node 200 of FIG. 6 comprises a select module 210b configured to perform step S104. The network management node 200 of FIG. 6 may further comprise a number of optional functional modules, such as any of an obtain module 210a configured to perform step S102, an obtain module 210c configured to perform step S104a, a provide module 210d configured to perform step S104b, a select module 210e configured to perform step S106a, a select module 210f configured to perform step S106b, and a select module 210g configured to perform step S106c. In general terms, each functional module 210a-210g may in one embodiment be implemented only in hardware and in another embodiment with the help of software, i.e., the latter embodiment having computer program instructions stored on the storage medium 230 which when run on the processing circuitry makes the network management node 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any steps as disclosed herein.

The network management node 200 may be provided as a standalone device or as a part of at least one further device. Alternatively, functionality of the network management node 200 may be distributed between at least two devices, or nodes. These at least two nodes, or devices, may either be part of the same network part (such as a (radio) access network or a core network) or may be spread between at least two such network parts. Thus, a first portion of the instructions performed by the network management node 200 may be executed in a first device, and a second portion of the of the instructions performed by the network management node 200 may be executed in a second device; the herein disclosed embodiments are not limited to any particular number of devices on which the instructions performed by the network management node 200 may be executed. Hence, the methods according to the herein disclosed embodiments are suitable to be performed by a network management node 200 residing in a cloud computational environment. Therefore, although a single processing circuitry 210 is illustrated in FIG. 5 the processing circuitry 210 may be distributed among a plurality of devices, or nodes. The same applies to the functional modules 210a-210g of FIG. 6 and the computer program 720 of FIG. 7.

Figure 7:
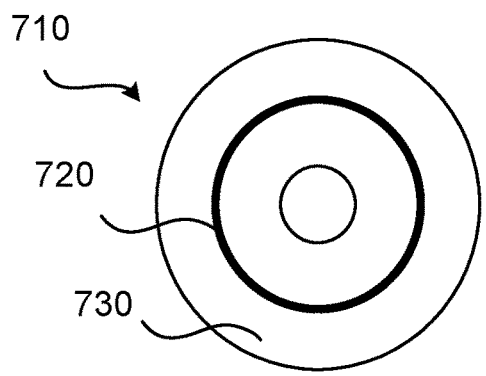
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

Figure 8:
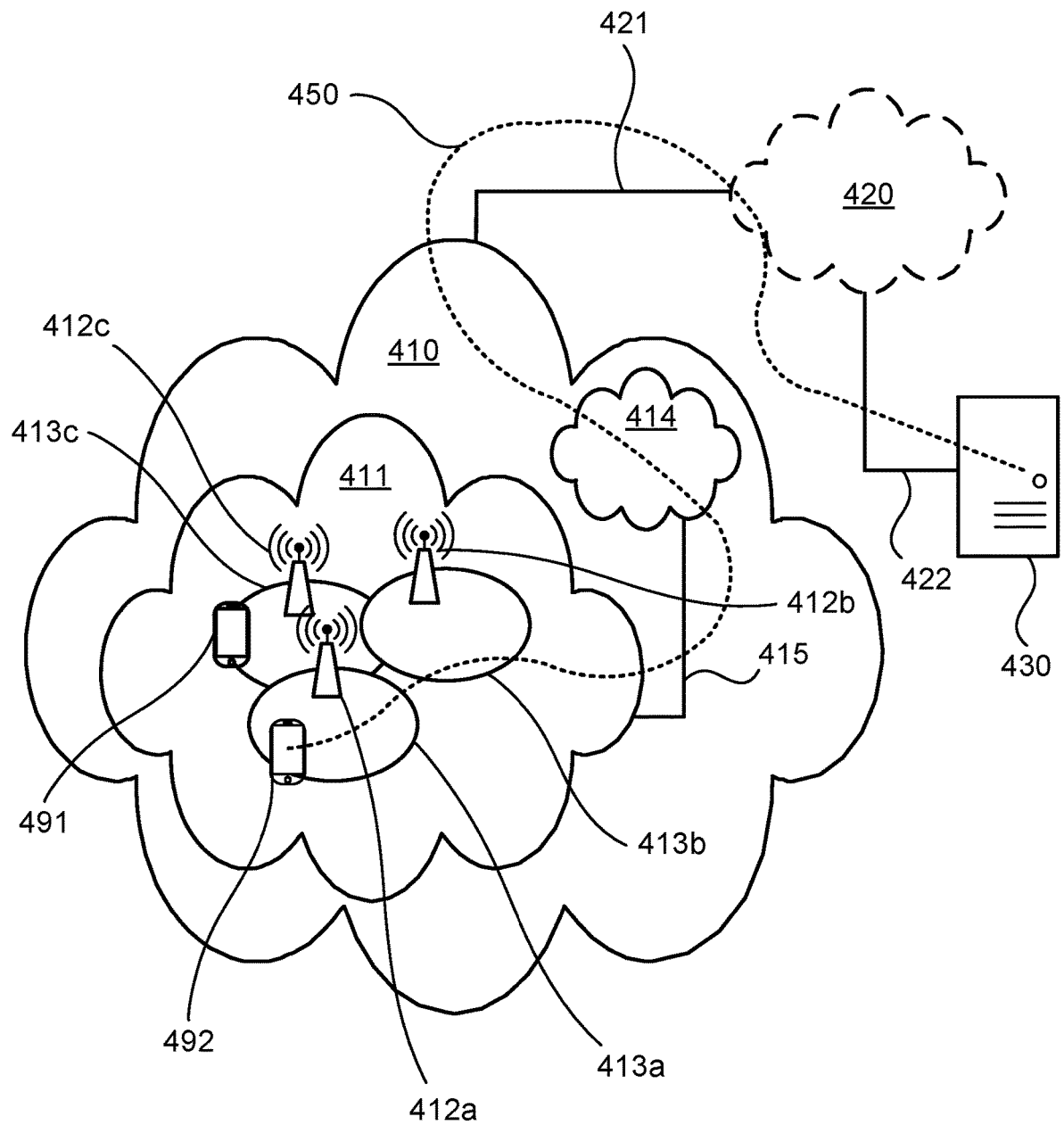
FIG. 8 is a schematic diagram illustrating a telecommunication network connected via an intermediate network to a host computer in accordance with some embodiments.

FIG. 8 is a schematic diagram illustrating a telecommunication network connected via an intermediate network 420 to a host computer 430 in accordance with some embodiments. In accordance with an embodiment, a communication system includes telecommunication network 410, such as a 3GPP-type cellular network, which comprises access network 411, and core network 414. Access network 411 comprises a plurality of radio access network nodes 412a, 412b, 412c, such as NBs, eNBs, gNBs (each corresponding to one of the access network nodes 130a:130d) or other types of wireless access points, each defining a corresponding coverage area, or cell, 413a, 413b, 413c. Each radio access network nodes 412a, 412b, 412C is connectable to core network 414 over a wired or wireless connection 415. A first UE 491 located in coverage area 413c is configured to wirelessly connect to, or be paged by, the corresponding network node 412c. A second UE 492 in coverage area 413a is wirelessly connectable to the corresponding network node 412a. While a plurality of UE 491, 492 are illustrated in this example, the disclosed embodiments are equally applicable to a situation where a sole UE is in the coverage area or where a sole terminal device is connecting to the corresponding network node 412. The UEs 491, 492 correspond to the wireless devices 150, 160.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected UE 491. Similarly, network node 412 need not be aware of the future routing of an outgoing uplink communication originating from the UE 491 towards the host computer 430.

Figure 9:
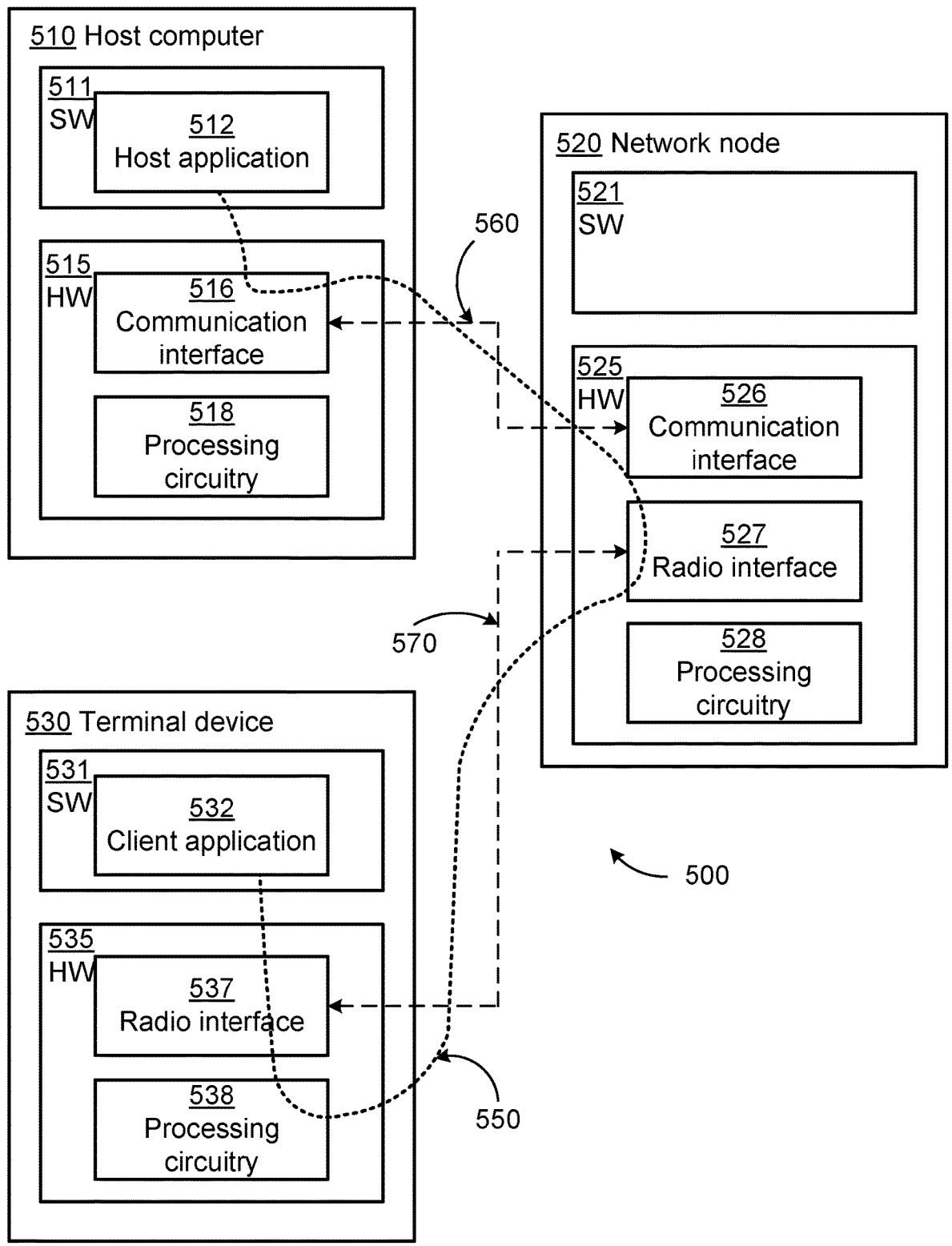
FIG. 9 is a schematic diagram illustrating host computer communicating via a radio base station with a terminal device over a partially wireless connection in accordance with some embodiments.

FIG. 9 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the wireless devices 150, 160. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to one of the access network nodes 130a:130d. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by radio access network node 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 9 may be similar or identical to host computer 430, one of network nodes 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce interference, due to improved classification ability of airborne UEs which can generate significant interference.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for selecting time-division duplex (TDD) patterns for downlink (DL) and uplink (UL) communication in TDD slots on component carriers (CCs) in a first cell, the method being performed by a network management node, the method comprising:
  performing selection of the TDD patterns for DL and UL communication on CCs in the first cell;
  according to the selection of the TDD patterns, at least first one of the CCs in the first cell supports DL heavy services and is configured with a first TDD pattern of the TDD patterns having a higher fraction of DL TDD slots than a fraction of UL TDD slots, and at least second one of the CCs in the first cell supports UL heavy services and is configured with a second TDD pattern of the TDD patterns having a higher fraction of UL TDD slots than a fraction of DL TDD slots,
  wherein the fraction of the DL TDD slots and the fraction of the UL TDD slots to use in the second TDD pattern is identified based at least on UL measurements in the first cell; and
  wherein a third cell neighboring the first cell, the network management node being configured to perform selection of a third TDD pattern for the third cell; and
  performing selection of the third TDD pattern for DL and UL communication on CCs in the third cell, and according to the third selection of the TDD pattern for the third cell, the CCs in the third cell is configured with the third TDD pattern having DL TDD slots only coinciding with the DL TDD slots of the second TDD pattern and UL TDD slots only coinciding with the UL TDD slots of the first TDD pattern.

2. The method according to claim 1, wherein a second cell neighboring the first cell, the method further comprising:
  obtaining information of selection of a TDD pattern for DL and UL communication on CCs in the second cell, and wherein according to the selection of TDD patterns for DL and UL communication on CCs in the first cell, at least one, but not all, of the CCs in the first cell is configured with a same TDD pattern as the CCs in the second cell.

3. The method according to claim 1, wherein according to the second TDD pattern, all TDD slots are UL TDD slots.

4. The method according to claim 1, wherein a fourth cell neighboring the first cell, wherein the network management node is configured to perform selection of a TDD pattern for the fourth cell, and wherein the method further comprises:
  performing selection of the TDD pattern for DL and UL communication on CCs in the fourth cell, wherein according to the selection of the TDD pattern for the fourth cell, DL and UL communication is to be performed on at least one CC not used in the first cell.

5. The method according to claim 1, wherein a second cell neighboring the first cell, and wherein the CCs used in the first cell occupy at least one frequency interval that is not occupied by CCs used in the second cell.

6. The method according to claim 1, wherein a second cell neighboring the first cell, and wherein the method further comprises:
   initiating blanking of at least some of DL TDD slots on CCs used in the second cell, wherein the at least some of the DL TDD slots to be blanked are determined based on the first TDD pattern and the second TDD pattern.

7. The method according to claim 1, wherein one single CC in the cell is configured with the first TDD pattern.

8. The method according to claim 1, wherein the first cell covers a private property area.

9. The method according to claim 8, wherein an industrial site is located at the private property area, wherein the first cell serves an industry network of the industrial site, and wherein a plurality of wireless devices of the industry network are served on the at least second one of the CCs configured with the second TDD pattern.

10. The method according to claim 1, wherein the CCs in the first cell occupy frequency bands equal to or higher than 24.25 GHz, or occupy frequency bands equal to or lower than 6 GHz.

11. The method according to claim 1, wherein only a subset of all wireless devices served in the first cell are served on the CCs configured with the second TDD pattern.

12. The method according to claim 1, wherein which of all wireless devices served in the first cell to be served on the CCs configured with the second TDD pattern depends on one or both of: required quality of service of the wireless devices and subscription of the wireless devices.

13. The method according to claim 1, wherein at least one of the CCs in the first cell is split into at least two further CCs, and wherein each of the at least two further CCs are individually configured with at least one of: the first TDD pattern, the second TDD pattern, or a fourth TDD pattern.

14. The method according to claim 1, wherein performing the selection of the TDD patterns for DL and UL communication on CCs in the first cell comprises:
   obtaining the first TDD pattern and the second TDD pattern; and
   providing an access network node serving the first cell with the first TDD pattern and the second TDD pattern.

15. The method according to claim 1, wherein the network management node is integrated with, collocated with, or part of an access network node serving the first cell with the first TDD pattern and the second TDD pattern.

16. The method according to claim 1, wherein the network management node is integrated with, collocated with, or part of a network-centric node controlling an access network node serving the first cell as well as at least one other access network node.

17. A network management node for selecting time-division duplex (TDD) patterns for downlink (DL) and uplink (UL) communication in TDD slots on component carriers (CCs) in a first cell, the network management node comprising processing circuitry, the processing circuitry being configured to cause the network management node to:
   perform selection of the TDD patterns for DL and UL communication on CCs in the first cell;
   according to the selection of the TDD patterns, at least first one of the CCs the first cell supports DL heavy services and is configured with a first TDD pattern of the TDD patterns having a higher fraction of DL TDD slots than a fraction of UL TDD slots, and at least second one of the CCs in the first cell supports UL heavy services and is configured with a second TDD pattern of the TDD patterns having a higher fraction of UL TDD slots than a fraction of DL TDD slots,
   wherein the fraction of the DL TDD slots and the fraction of the UL TDD slots to use in the second TDD pattern is identified based at least on UL measurements in the first cell; and
   wherein a third cell neighboring the first cell, the network management node being configured to perform selection of a third TDD pattern for the third cell; and
   perform selection of the third TDD pattern for DL and UL communication on CCs in the third cell, and according to the selection of the third TDD pattern for the third cell, the CCs in the third cell being configured with the third TDD pattern having DL TDD slots only coinciding with the DL TDD slots of the second TDD pattern and the UL TDD slots only coinciding with UL TDD slots of the first TDD pattern.

18. The network management node according to claim 17, wherein a second cell neighboring the first cell, the network management node being further configured to:
   obtain information of selection of a TDD pattern for DL and UL communication on CCs in the second cell, and wherein according to the selection of TDD patterns for DL and UL communication on CCs in the first cell, at least one, but not all, of the CCs in the first cell is configured with a same TDD pattern as the CCs in the second cell.

19. A non-transitory computer storage medium storing a computer program for selecting time-division duplex (TDD) patterns for downlink (DL) and uplink (UL) communication in TDD slots on component carriers (CCs) in a first cell, the computer program comprising computer code which, when run on processing circuitry of a network management node, causes the network management node to:
   perform selection of the TDD patterns for DL and UL communication on CCs in the first cell;
   according to the selection of the TDD patterns, at least first one of the CCs in the first cell supports DL heavy services and is configured with a first TDD pattern of the TDD patterns having a higher fraction of DL TDD slots than a fraction of UL TDD slots, and at least second one of the CCs in the first cell supports UL heavy services and is configured with a second TDD pattern of the TDD patterns having a higher fraction of UL TDD slots than a fraction of DL TDD slots,
   wherein the fraction of the DL TDD slots and the fraction of the UL TDD slots to use in the second TDD pattern is identified based at least on UL measurements in the first cell; and
   wherein a third cell neighboring the first cell, the network management node being configured to:
   perform selection of a third TDD pattern for the third cell; and
   perform selection of the third TDD pattern for DL and UL communication on CCs in the third cell, and according to the selection of the third TDD pattern for the third cell, the CCs in the third cell being configured with the third TDD pattern having DL TDD slots only coinciding with the DL TDD slots of the second TDD pattern and UL TDD slots only coinciding with the UL TDD slots of the first TDD pattern.

* * * * *